US011910203B2

United States Patent
Landis et al.

(10) Patent No.: US 11,910,203 B2
(45) Date of Patent: Feb. 20, 2024

(54) RADIO (NR) ADAPTATION OF CELLULAR NETWORK CONFIGURATION IN RESPONSE TO MACHINE LEARNING BASED WEATHER PREDICTION

(71) Applicant: QUALCOMM Incorporated, San Diego, CA (US)

(72) Inventors: Shay Landis, Hod Hasharon (IL); Assaf Touboul, Netanya (IL); Guy Wolf, Rosh Haayin (IL); Peer Berger, Hod Hasharon (IL); David Yunusov, Holon (IL); Ran Berliner, Kfar-Aviv (IL); Michael Levitsky, Rehovot (IL); Sharon Levy, Binyamina (IL); Noam Zach, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 17/031,302

(22) Filed: Sep. 24, 2020

(65) Prior Publication Data

US 2022/0095128 A1 Mar. 24, 2022

(51) Int. Cl.
| | |
|---|---|
| *H04W 24/02* | (2009.01) |
| *G06N 3/08* | (2023.01) |
| *H04L 1/00* | (2006.01) |
| *H04W 52/18* | (2009.01) |
| *H04W 72/04* | (2023.01) |

(52) U.S. Cl.
CPC .............. *H04W 24/02* (2013.01); *G06N 3/08* (2013.01); *H04L 1/0003* (2013.01); *H04W 52/18* (2013.01); *H04W 72/04* (2013.01)

(58) Field of Classification Search
CPC ..... H04W 24/02; H04W 52/18; H04W 72/04; G06N 3/08; H04L 1/0003
See application file for complete search history.

(56) References Cited

U.S. PATENT DOCUMENTS

| | | | |
|---|---|---|---|
| 10,594,380 B1* | 3/2020 | Nammi ................. | H04L 5/0048 |
| 2005/0159894 A1* | 7/2005 | Intriligator ............. | G01W 1/10 |
| | | | 702/3 |
| 2009/0046768 A1 | 2/2009 | Pare, Jr. | |
| 2014/0372577 A1* | 12/2014 | Hui ........................ | H04L 67/12 |
| | | | 709/221 |
| 2016/0259061 A1* | 9/2016 | Carter .................... | G01S 19/28 |

(Continued)

FOREIGN PATENT DOCUMENTS

CN            113454923 A  *  9/2021  ........... H04B 7/0456

OTHER PUBLICATIONS

"Channel State Information Prediction for 5G Wireless Communications: A Deep Learning Approach", Luo et al., IEEE Transactions on Network Science and Engineering, Published Jun. 2018.*

(Continued)

*Primary Examiner* — Qun Shen
(74) *Attorney, Agent, or Firm* — QUALCOMM Incorporated

(57) ABSTRACT

A communications device inputs channel state information to an artificial neural network. The communications device predicts weather conditions with the artificial neural network based on the channel state information. The communications device further adjusts communications based on the predicted weather conditions.

31 Claims, 5 Drawing Sheets

(56) References Cited

U.S. PATENT DOCUMENTS

| | | | | |
|---|---|---|---|---|
| 2017/0064531 A1* | 3/2017 | Stephenne | ............... | G06T 7/20 |
| 2017/0371074 A1* | 12/2017 | Elkabetz | ................ | G01W 1/10 |
| 2019/0020530 A1* | 1/2019 | Au | ..................... | H04W 72/21 |
| 2020/0028609 A1 | 1/2020 | Ahn et al. | | |
| 2020/0267747 A1* | 8/2020 | Nammi | ................ | H04W 72/23 |

OTHER PUBLICATIONS

Baik S., et al., "Machine Learning in IMT-2020 and Future Networks: Use Cases and Basic Requirements", ITU-T Draft, Study Period 2017-2020, Study Group 13, Series TD1-R1, International Telecommunication Union, Geneva, Switzerland, Jun. 24, 2019 (Jun. 24, 2019), pp. 1-53, Retrieved from the Internet: URL: https://www.itu.int/ifa/t/2017/sg13/exchange/wp1/q20/2019-06/drafting/ML-Use%20Cases%20and%20Reqts/T17-SG13RGM-17289-190617-TD-0001-R01-24jun-01-18h30.docx [retrieved on Jun. 24, 2019].
International Search Report and Written Opinion—PCT/US2021/047356—ISA/EPO—dated Dec. 8, 2021.

\* cited by examiner

RADIO (NR) ADAPTATION OF CELLULAR NETWORK CONFIGURATION IN RESPONSE TO MACHINE LEARNING BASED WEATHER PREDICTION

FIELD OF THE DISCLOSURE

Aspects of the present disclosure generally relate to wireless communications, and more particularly to techniques and apparatuses for 5G new radio (NR) adaptation of cellular network configurations in response to a machine learning based weather prediction using cellular channel information (CSI) and sensor fusion.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to an aspect of the present disclosure, a method of wireless communication inputs channel state information to an artificial neural network. The method predicts weather conditions with the artificial neural network based on the channel state information. The method further adjusts communications based on the predicted weather conditions.

In another aspect of the present disclosure, an apparatus for wireless communications at a user equipment (UE), includes a processor and memory coupled with the processor. Instructions stored in the memory are operable, when executed by the processor, to cause the apparatus to input channel state information to an artificial neural network. The apparatus can predict weather conditions with the artificial neural network based on the channel state information. The apparatus can also adjust communications based on the predicted weather conditions.

In another aspect of the present disclosure, a communications device for wireless communications includes means for inputting channel state information to an artificial neural network. The communications device includes means for predicting weather conditions with the artificial neural network based on the channel state information. The communications device also includes means for adjusting communications based on the predicted weather conditions.

In another aspect of the present disclosure, a non-transitory computer-readable medium with program code recorded thereon is disclosed. The program code is executed by a communications device and includes program code to input channel state information to an artificial neural network. The communications device includes program code to predict weather conditions with the artificial neural network based on the channel state information. The communications device also includes program code to adjust communications based on the predicted weather conditions.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
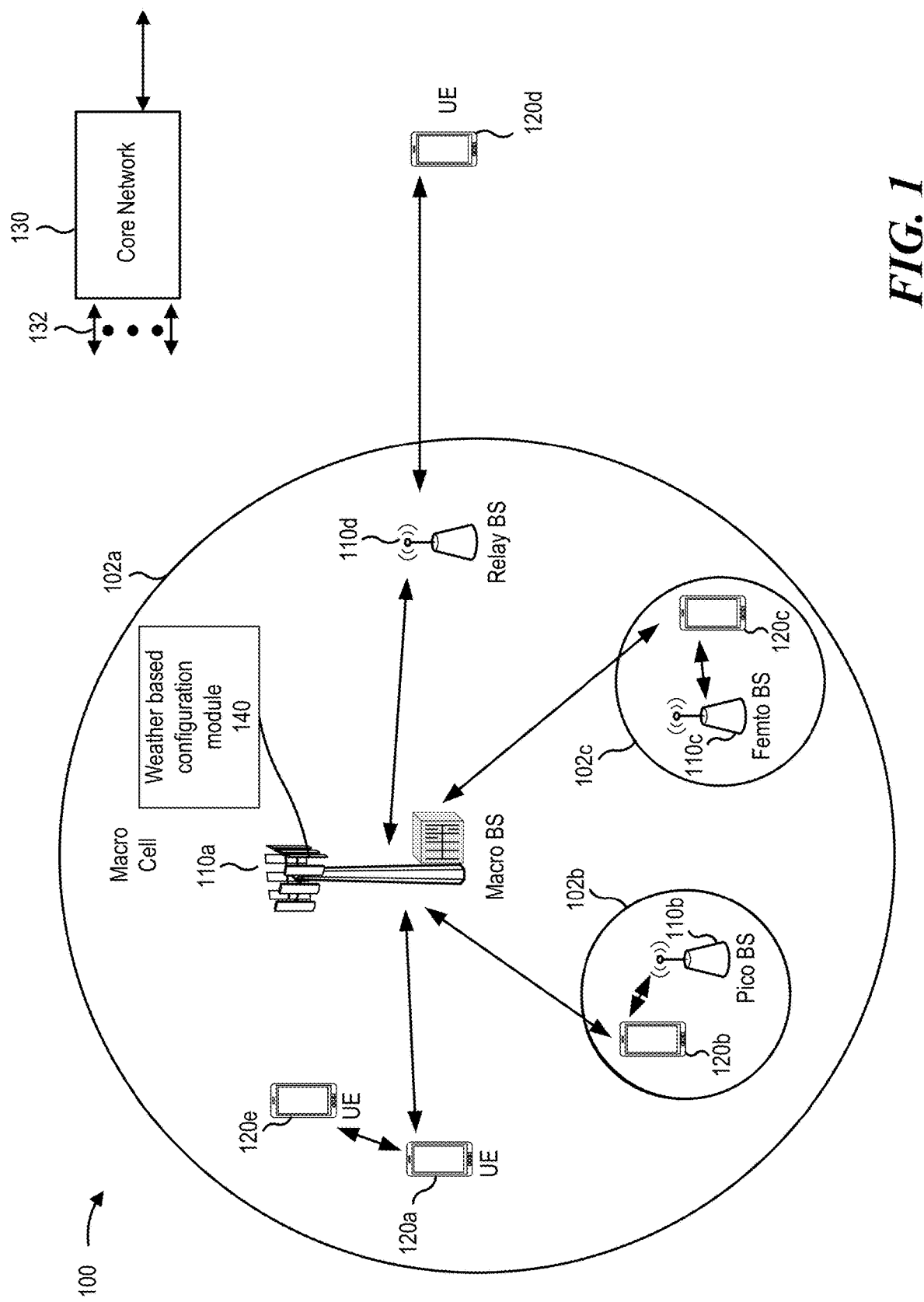
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Weather monitoring is an important and active area of research. As an example, research is directed to using wireless channel state information (CSI) to monitor current weather conditions and predict future weather. In conventional systems, commercial cellular data tracks precipitation, fog, and near-surface moisture. Deep learning may use wireless channel state information to predict and monitor the weather. This approach, however, requires large data sets that are not readily available.

In some cases, a base station, and possibly the user equipment (UE), can collect data from the sensors (e.g., camera, RADAR (radio detection and ranging), LIDAR (light detection and ranging), etc.) and fuse the sensor data with the channel state information to generate datasets for training various functions, including deep learning functions. Deep learning functions may be trained on these datasets for weather monitoring and prediction. Cellular networks can improve cellular performance using weather based inferences from the deep learning functions in response to cellular channel state information. For example, a different transmit power threshold may be configured for the cellular system depending on a weather prediction. In another example, a different beamforming codebook design can be used on a sunny day versus a rainy day. In still another example, rate control can be adjusted based on changing weather conditions. In yet another example, a weather-based quality of service (QOS) inter-band operation can be introduced, in which the network may switch from a less sensitive band to a more sensitive band when weather is predicted to improve, and vice versa.

These datasets can be generated by existing cellular infrastructure. For example, the base station (e.g., gNB) may collect channel state information from user equipments (UEs) either as reports or directly from the sounding reference signals (SRSs) transmitted by UEs. In one aspect, the reports may be based on measurements solely generated for the purpose of weather prediction. In other aspects, the reports are based on measurements currently specified for channel estimates and other UE functions. In still other aspects, the reports are a combination of weather specific data and currently specified reporting data.

According to an aspect of the present disclosure, the base station collects sensor data from one or more sensors, such as LIDAR, cameras, etc., which may serve as the ground truth for the datasets. Based on the received reports and sensor data, the base station runs a machine learning model to track and/or predict the weather. In accordance with the weather data inferred from the machine learning model, the base station updates network configurations. For example, different transmit power thresholds, different beamforming codebook design, different frequency bands and/or different rates can be configured for the system depending on the weather. In another example, enhanced coverage base stations are activated or deactivated based on the weather. Finally, a UE path loss estimation can be updated in accordance with weather predictions. With the benefit of the machine learning weather data, the cellular network may adapt to weather conditions with less specified feedback, thereby improving network performance.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UE 120 or the base station 110 may include a weather based configuration module 140. For brevity, only one base station 110 (and no UEs) is shown as including the configuration module 140. The configuration module 140 may input channel state information to an artificial neural network. The weather based configuration module 140 may also predict weather conditions with the artificial neural network based on the channel state information and adjust communications based on the weather conditions.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
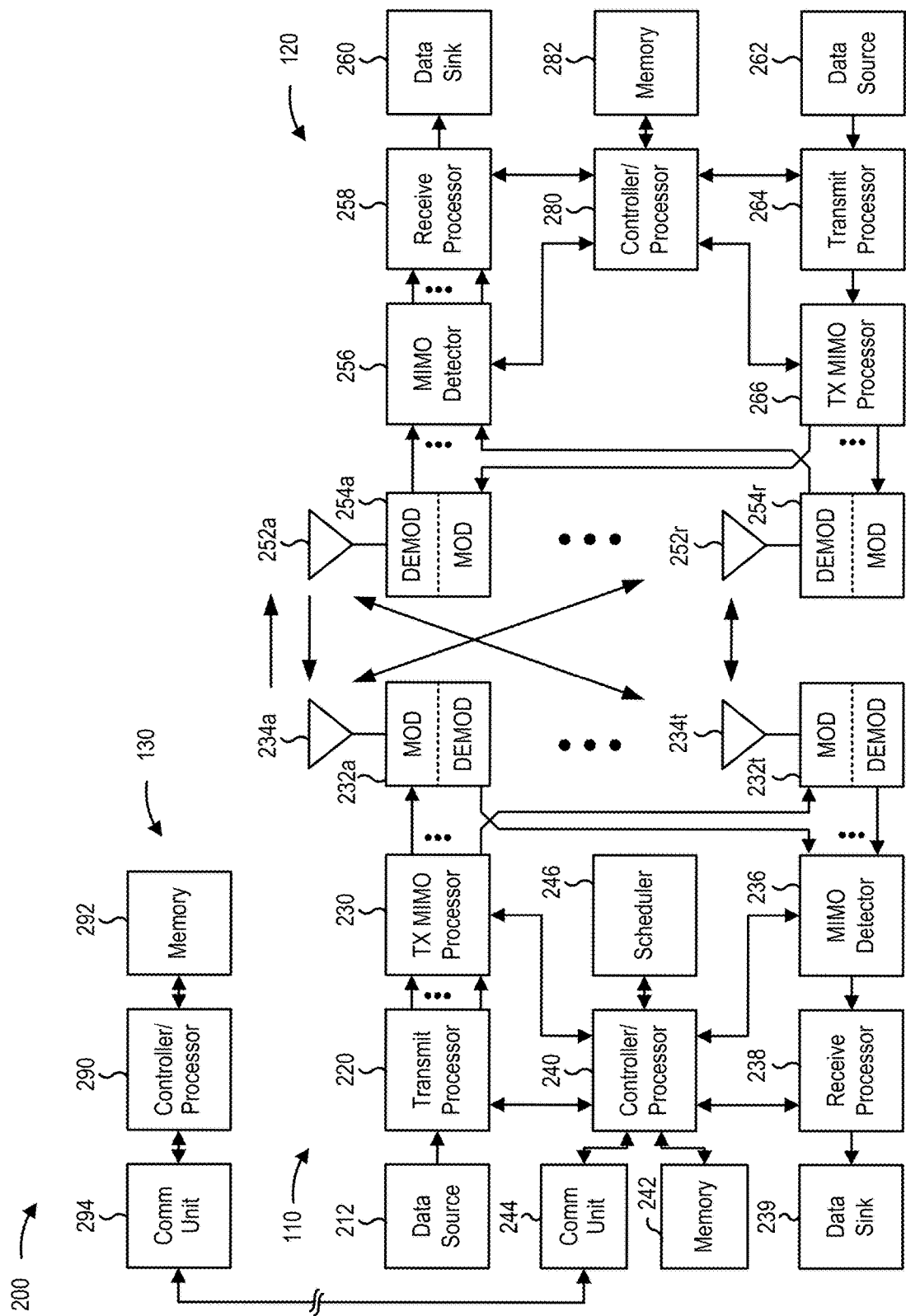
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110 and/or any other component(s) of FIG. 2 may perform one or more techniques associated with weather based network configuration as described in more detail elsewhere. For example, the controller/processor 240 of the base station 110, and/or any other component(s) of FIG. 2 may perform or direct operations of, for example, the process of FIG. 5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or the base station 110 may include means for inputting, means for predicting, means for adjusting, means for activating, means for changing, means for controlling, and/or means for requesting mean. Such means may include one or more components of the UE 120 or the base station 110 described in connection with FIG. 2.

As indicated above, FIG. 2 is provided merely as an example. Other examples may differ from what is described with regard to FIG. 2.

As described, channel state information (CSI) may be used for monitoring current weather and/or predicting future weather. Conventional systems use commercial cellular data to track precipitation, fog, and near-surface moisture. In some cases, deep learning systems, such as a deep learning model, may use wireless channel state information to predict and monitor the weather. Large data sets may be specified for training the deep learning systems. These large data sets that are not readily available.

According to aspects of the present disclosure, a base station, and possibly the user equipment (UE), can collect data from the sensors (e.g., camera, RADAR (radio detection and ranging), LIDAR (light detection and ranging)) and fuse the sensor data with the channel state information to generate data sets for training various functions, including deep learning functions. Learning can occur on a few base stations, which are coupled with sensors. The base stations may be dispersed throughout an environment, such as a city, state, or throughout the world. Once the dataset is collected and a neural network is trained, the neural network can be run on a number of base stations in various environments. Although the description is primarily with respect to a base station predicting weather conditions and adjusting communications, the present disclosure also applies to a UE predicting weather conditions and adjusting communications.

According to aspects of the present disclosure, cellular generated datasets are defined for weather monitoring and prediction using cellular channel state information and sensor fusion. In other aspects, the cellular generated datasets may help with channel modeling validation.

Deep learning functions may be trained on datasets for weather monitoring and prediction. Cellular networks can improve cellular performance using weather based inferences from the deep learning functions in response to cellular channel state information. For example, a different transmit power threshold may be imposed on a cellular system depending on predicted weather. In another example, a different beamforming codebook design can be used on a sunny day versus a rainy day. In still another example, rate control can be adjusted by adapting the modulation and coding scheme (MCS) based on changing weather conditions.

In yet another example, a weather-based quality of service (QOS) inter-band operation can be introduced. That is, some frequency bands are more sensitive than others in terms of weather. Thus, the network may switch from a less sensitive band (e.g., frequency range one (FR1)) to a more sensitive band (e.g., frequency range two (FR2), frequency range four (FR4), frequency range five (FR5), or higher bands) when the weather is predicted to improve. Similarly, the network may switch from a more sensitive frequency band to a less sensitive band when weather conditions deteriorate.

In an aspect of the present disclosure, cellular data may be used to track precipitation, fog, near-surface moisture, and predict floods. The cellular data reflects a cellular channel, which may change due to precipitation, fog, etc. Learning how the channel changes due to weather changes may couple the channel conditions to weather conditions.

Tracking and predicting the weather using cellular channel information and deep learning specifies large datasets. These datasets can be generated by existing cellular infrastructure. For example, the base station (e.g., gNB) may collect channel state information from user equipments (UEs) either as reports or directly from the sounding reference signals (SRSs) transmitted by UEs. In one aspect, the reports may be based on measurements solely generated for the purpose of weather prediction. In other aspects, the reports are based on measurements currently specified for channel estimates and other wireless communication functions. In still other aspects, the reports are a combination of weather specific data and currently specified reporting data.

Examples of measurements solely generated for the purpose of weather prediction include statistics that are not directly related to improving a communications channel but are relevant for weather prediction. Examples of report data that may be specific to weather prediction include a full channel impulse response or delay spread statistic, including mean, maximal energy, and/or variance of delay spread. The reports may be periodic or on-demand. In some aspects, the reporting of data for weather prediction occurs even while a data connection does not exist between the UE and the base station, such as during a discontinuous reception (DRX) mode.

Figure 3A:
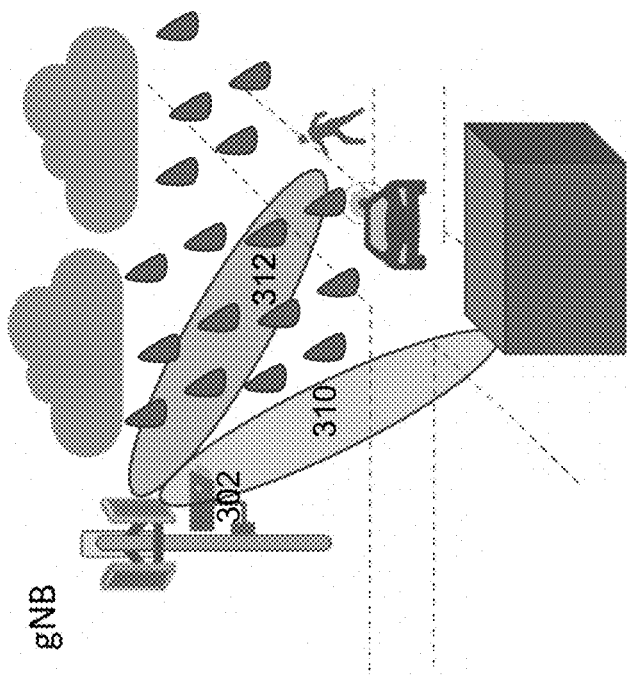
FIGS. 3A and 3B are diagrams illustrating examples of weather conditions affecting a cellular network, in accordance with aspects of the present disclosure.
Figure 3B:
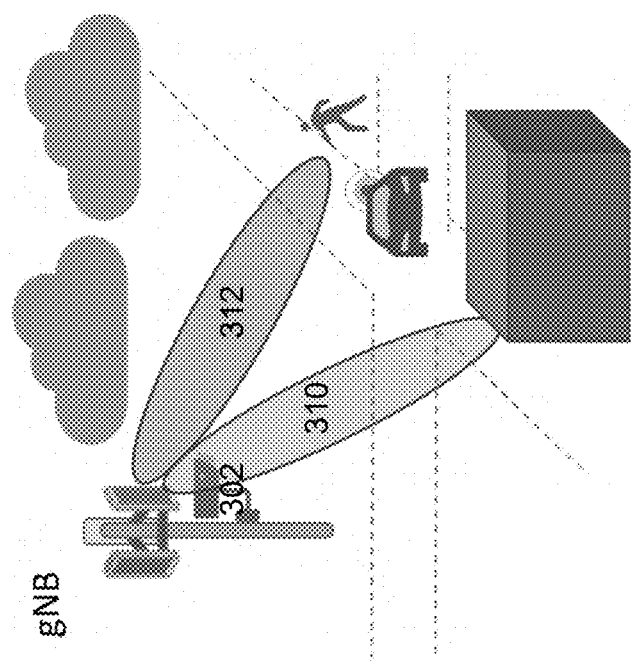

In an aspect of the present disclosure, the base station collects sensor information from one or more sensors, such as LIDAR, cameras, etc., which may serve as the ground truth for the datasets. FIGS. 3A and 3B are diagrams illustrating examples of weather conditions affecting a cellular network, in accordance with aspects of the present disclosure. As seen in FIGS. 3A and 3B, a base station (e.g., gNB) receives sensor data from a camera 302. The base station (e.g., gNB) also receives LIDAR data based on laser light beams 310, 312. In FIG. 3A, the weather condition is cloudy, resulting in a first type of camera data and LIDAR data. In FIG. 3B, the weather condition is raining, resulting in generation of a second type of camera data and LIDAR data. Using sensors, such as cameras and LIDAR, alone for weather tracking/prediction, however, may not be a good approach because sensors are not deployed throughout the cellular infrastructure. Thus, cellular data can help track weather conditions because channel state information is widely available and the cellular channel changes when the weather changes.

According to aspects of the present disclosure, by tracking and predicting weather changes, the cellular network can adapt quickly to weather changes and with less feedback. For example, different transmit power thresholds can be imposed on the system depending on the weather. In another example, enhanced coverage can be provided by supplemental base stations. The supplemental bases stations are activated only when weather decreases cell coverage. By responding to weather data, power consumption is reduced for these supplemental base stations, because they are not always on.

In other aspects, different beamforming codebook designs can be used depending on the weather conditions. One codebook may be used on sunny days whereas another codebook is used on rainy days. In another example, rate control can be adjusted based on changing weather conditions, for example, by adapting the modulation and coding scheme (MCS). In yet another example, a weather-based quality of service (QOS) inter-band operation can be introduced. That is, frequency bands more sensitive to weather may be deselected when weather conditions deteriorate, such as when rain becomes heavy.

Finally, the UE path loss estimation can be updated in accordance with weather predictions. That is, a path loss may change due to weather changes. However, path loss reports are infrequent. Thus, the weather prediction can fill in the gaps between path loss reports to obtain more accurate path loss estimates. The resulting path loss estimates can be used to adjust MCS, transmit power, etc.

Figure 4:
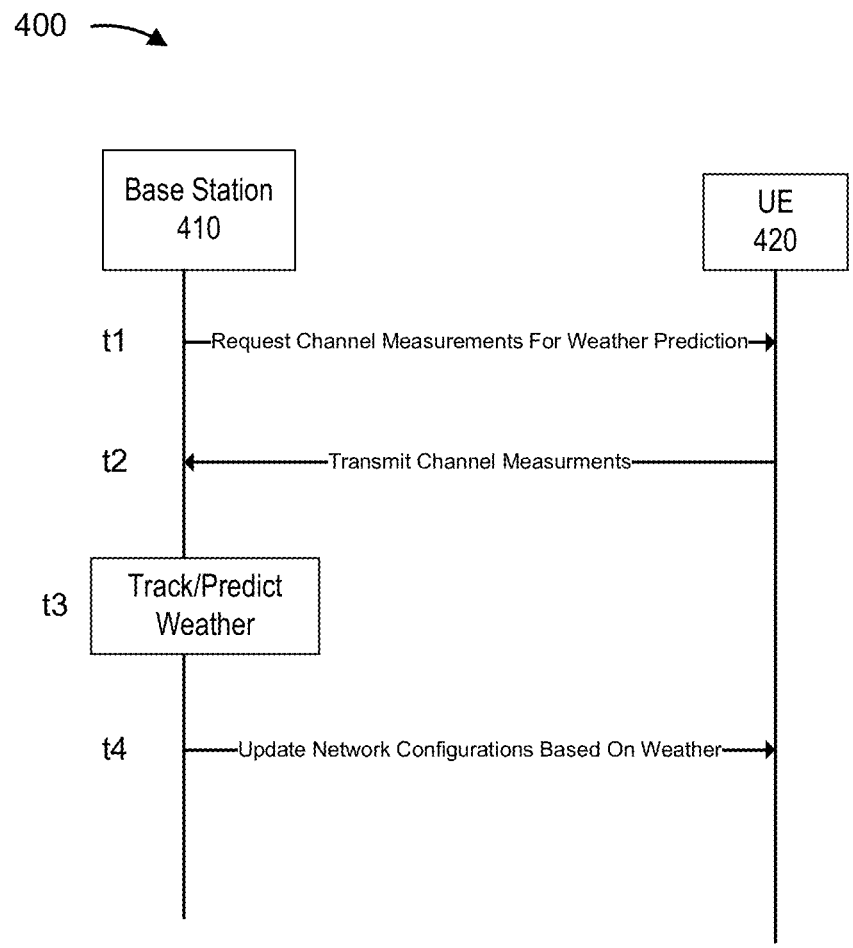
FIG. 4 is a call flow diagram illustrating an example configuration of a cellular network based on a machine learning weather prediction performed in accordance with various aspects of the present disclosure.

FIG. 4 is a call flow diagram illustrating an example configuration of a cellular network based on a machine learning weather prediction, in accordance with various aspects of the present disclosure. As shown in FIG. 4, in the wireless network 400, at time t1, a base station 410 requests channel measurements for weather prediction, from a UE 420. The measurements can be solely for the purpose of weather prediction, such as delay spread statistics and/or can be standardized channel state information measurements. At time t2, the UE 420 reports the measurements to the base station 410.

Based on the received measurements, at time t3, the base station 410 runs a machine learning model to track and/or predict the weather. In accordance with the weather data output from the machine learning model, the base station updates network configurations at time t4. For example, different transmit power thresholds, different beamforming codebook designs, different frequency bands, and/or different rates can be configured for the network 400 depending on the weather. In another example, supplemental base stations are activated or deactivated based on the weather. Finally, the UE path loss estimation can be updated in accordance with weather predictions. As described, the cellular network 400 may adapt to changes in the weather with less specified feedback, based on current and/or predicted weather conditions.

As indicated above, FIGS. 3-4 are provided as examples. Other examples may differ from what is described with respect to FIGS. 3-4.

Figure 5:
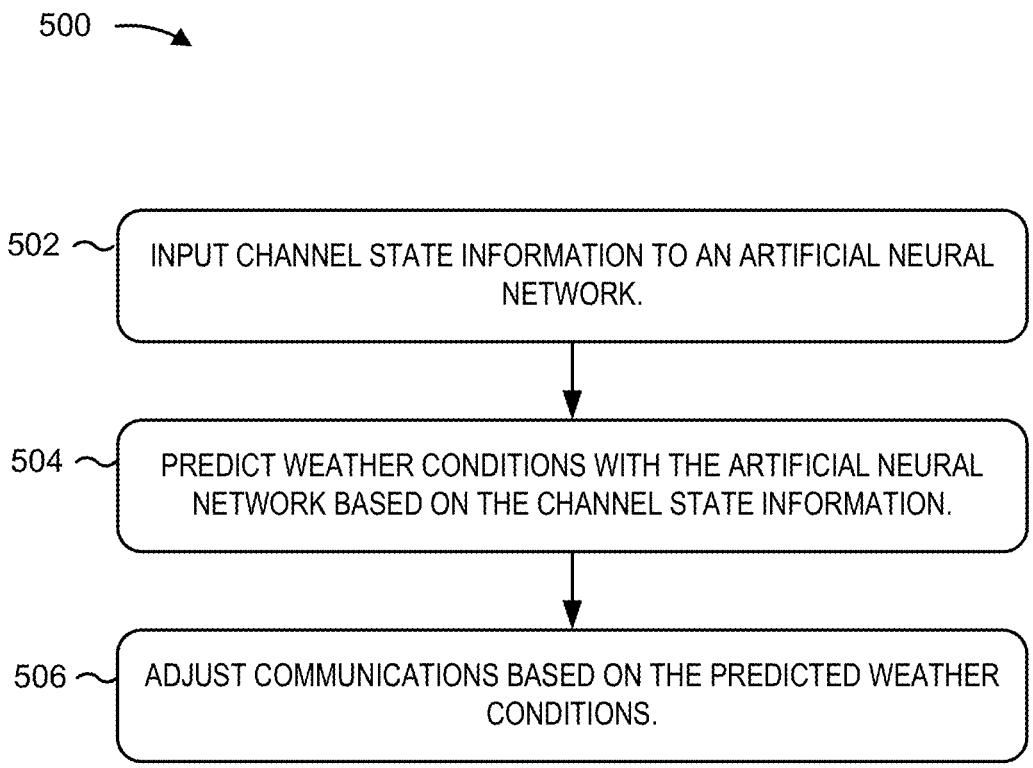
FIG. 5 is a flow diagram illustrating an example adaptation of a cellular network based on a machine learning weather prediction performed in accordance with various aspects of the present disclosure.

FIG. 5 is a diagram illustrating an example process 500 performed, for example, by a base station or a UE, in accordance with various aspects of the present disclosure. The example process 500 is an example of new radio (NR) adaptation of cellular network configurations in response to a machine learning based weather prediction using channel state information (CSI) and sensor fusion.

As shown in FIG. 5, in some aspects, the process 500 may include inputting channel state information to an artificial neural network (block 502). For example, the communications device (e.g., using the controller/processor 280, 240, and/or memory 282, 242) can input channel state information to an artificial neural network. The process 500 may include predicting weather conditions with the artificial neural network based on the channel state information (block 504). For example, the communications device (e.g., using the controller/processor 280, 240 and/or memory 282, 242) can predict weather conditions. The process 500 may also include adjusting communications based on the predicted weather conditions (block 506). For example, the communications device (e.g., using the antenna 252, 234, DEMOD/MOD 254, 232, MIMO detector 256, 236, TX MIMO processor 266, 230, receive processor 258, 238, transmit processor 264, 220, controller/processor 280, 240, and/or memory 282, 242) can adjust communications.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a communications device, comprising:
   requesting a user equipment (UE) to report cellular channel state information measurements for weather prediction, the cellular channel state information measurements comprising a full channel impulse response or delay spread statistics;
   inputting the cellular channel state information measurements to an artificial neural network;
   predicting weather conditions with the artificial neural network based on the cellular channel state information measurements; and
   adjusting communications with a remote device based on the predicted weather conditions.

2. The method of claim 1, in which adjusting the communications comprises adjusting a transmit power.

3. The method of claim 1, in which adjusting the communications comprises activating a supplemental base station.

4. The method of claim 1, in which adjusting the communications comprises adjusting a beamforming codebook.

5. The method of claim 1, in which adjusting the communications comprises changing a frequency band for communications.

6. The method of claim 1, in which adjusting the communications comprises controlling a data rate by adjusting a modulation and coding scheme (MCS).

7. The method of claim 1, in which adjusting the communications comprises adjusting a path loss estimate to further adjust the communications.

8. The method of claim 1, in which the reporting occurs while a data connection does not exist.

9. The method of claim 1, in which the communications device comprises a base station.

10. The method of claim 1, in which the communications device comprises a user equipment (UE).

11. An apparatus for wireless communications by a communications device, comprising:
   a processor,
   memory coupled with the processor; and
   instructions stored in the memory and operable, when executed by the processor, to cause the apparatus:
      to request a user equipment (UE) to report cellular channel state information measurements for weather prediction, the cellular channel state information measurements comprising a full channel impulse response or delay spread statistics;
      to input the cellular channel state information measurements to an artificial neural network;
      to predict weather conditions with the artificial neural network based on the cellular channel state information measurements; and
      to adjust communications with a remote device based on the predicted weather conditions.

12. The apparatus of claim 11, in which the processor causes the apparatus to adjust the communications by adjusting a transmit power.

13. The apparatus of claim 11, in which the processor causes the apparatus to adjust the communications by activating a supplemental base station.

14. The apparatus of claim 11, in which the processor causes the apparatus to adjust the communications by adjusting a beamforming codebook.

15. The apparatus of claim 11, in which the processor causes the apparatus to adjust the communications by changing a frequency band for communications.

16. The apparatus of claim 11, in which the processor causes the apparatus to adjust the communications by controlling a data rate to adjust a modulation and coding scheme (MCS).

17. The apparatus of claim 11, in which the processor causes the apparatus to adjust the communications by adjusting a path loss estimate to further adjust the communications.

18. The apparatus of claim 11, in which the processor causes the apparatus to report while a data connection does not exist.

19. The apparatus of claim 11, in which the communications device comprises a base station.

20. The apparatus of claim 11, in which the communications device comprises a user equipment (UE).

21. A communications device for wireless communications, comprising:
   means for requesting a user equipment (UE) to report cellular channel state information measurements for weather prediction, the cellular channel state information measurements comprising a full channel impulse response or delay spread statistics;
   means for inputting the cellular channel state information measurements to an artificial neural network;
   means for predicting weather conditions with the artificial neural network based on the cellular channel state information measurements; and
   means for adjusting communications with a remote device based on the predicted weather conditions.

22. The communications device of claim 21, in which the means for adjusting the communications comprises means for adjusting a transmit power.

23. The communications device of claim 21, in which the means for adjusting the communications comprises means for activating a supplemental base station.

24. The communications device of claim 21, in which the means for adjusting the communications comprises means for adjusting a beamforming codebook.

25. The communications device of claim 21, in which the means for adjusting the communications comprises means for changing a frequency band for communications.

26. The communications device of claim 21, in which the means for adjusting the communications comprises means for controlling a data rate to adjust a modulation and coding scheme (MCS).

27. The communications device of claim 21, in which the means for adjusting the communications comprises means for adjusting a path loss estimate to further adjust the communications.

28. The communications device of claim 21, in which the reporting occurs while a data connection does not exist.

29. The communications device of claim 21, in which the communications device comprises a base station.

30. The communications device of claim 21, in which the communications device comprises a user equipment (UE).

31. A non-transitory computer-readable medium having program code recorded thereon, the program code executed by a communications device and comprising:
   program code to request a user equipment (UE) to report cellular channel state information measurements for weather prediction, the cellular channel state information measurements comprising a full channel impulse response or delay spread statistics;
   program code to input the cellular channel state information measurements to an artificial neural network;
   program code to predict weather conditions with the artificial neural network based on the cellular channel state information measurements; and
   program code to adjust communications with a remote device based on the predicted weather conditions.

* * * * *